United States Patent Office 3,248,369
Patented Apr. 26, 1966

3,248,369
TERTIARY AMINE ACRYLATES AS CATALYSTS FOR POLYESTER-DIISOCYANATE REACTIONS
Richard A. Weidman, Bedford, Donald Tobin, Auburndale, and James R. Cowan, Jr., Waltham, Mass., assignors, by mesne assignments, to United Shoe Machinery Corporation, Boston, Mass., a corporation of New Jersey
No Drawing. Filed June 26, 1961, Ser. No. 119,300
6 Claims. (Cl. 260—75)

The present case is a continuation-in-part of our copending application Serial No. 733,837, filed May 8, 1958, and now abandoned.

This invention relates to improved cross-linking resinous compositions useful to form tough, lustrous coatings and particularly to compositions useful in forming mar-resistant patent leather.

The manufacture of patent leather involves applying a series of coats of linseed oil varnish, which may contain dye and pigments, to buffed leather stretched on a frame. Each coating is dried before application of the next, and after application of the last coat it is usual to subject the leather to treatment such as heat or ultraviolet radiation to harden the surface of the coatings and to remove tackiness. The results are somewhat uncertain because of the necessity to treat the surface for a sufficient time to harden it and remove tackiness while avoiding excessive treatment which causes hardening and embrittlement of the coats as well as a degrading effect on the leather.

It has been proposed to harden the varnish coatings by treatments with liquid or vaporous polyisocyanates. These treatments are difficult to control and frequently result in hardening the entire thickness of the coatings. Such over-hardened coatings are stiff and tend to crack if the leather is sharply folded. The vapor treatment is inconvenient and hazardous and requires elaborate equipment.

It is a feature of the present invention to provide a liquid coating composition possessing desirable characteristics for application and possessing desirable stability before application coupled with excellent curing speed after application.

It is a further feature of the present invention to provide a coating composition useful in combination with varnish coats in the making of patent leather and having controlled reactivity for coaction with varnish coatings to provide a tough, lustrous, non-tacky surface finish for patent leather.

The coating composition of the present invention includes an inert volatile organic solvent solution of a resinous prepolymer or adduct of a polyester containing terminal hydroxyl groups with a substantial excess of polyisocyanate over the amount sufficient to provide one —NCO group for reaction with each of the said hydroxyl groups of the polyester. Controlled reactivity of the prepolymer and a desirable cross-linking action to form a tough, flexible film after application is secured by incorporating in the solution a controlled amount of a tertiary amine ethyl acrylate catalyst. This material functions as a catalyst to initiate a cross-linking action between the free —NCO groups and the urethane groups of the prepolymer. It is the special nature of this material to be relatively inactive when the coating composition is diluted by the solvent. On the other hand, after spreading a film of the coating, the tertiary amine ethyl acrylate exhibits excellent, uniform, fairly rapid catalytic action to initiate cross-linking. The curing, e.g. cross-linking of a film of the composition deposited on a varnish coated leather, proceeds at a rate which results in a desirable union between the applied resin coating and the varnish coatings so that in the cured product, the composite varnish and resin coating has toughness, flexibility, mar-resistance and luster.

The present coating compositions are ordinarily supplied in two parts which are mixed shortly prior to use. One of these parts is a solution in an inert or non-reactive volatile organic solvent or solvent mixture of a resinous polymer or adduct or mixture of resinous polymers or adducts. The other part is a solution also in a volatile non-reactive organic solvent, or mixture of solvents, of the catalyst. By inert or non-reactive reference is made throughout to solvents which are non-reactive with the —NCO and urethane groups of the prepolymer and the tertiary amine group of the catalyst.

Resinous prepolymers useful in the present composition are obtained by reacting relatively low molecular weight polyesters with a substantial excess of organic polyisocyanate over the amount required to provide an —NCO group for each hydroxyl group.

Many polyesters useful for reaction with polyisocyanates are known and are commercially available. They are formed by esterifying and polymerizing polybasic, preferably a dibasic carboxylic acid, or mixtures of these acids, with a complementary polyhydric alcohol or mixtures of the same. Suitable polybasic acids for reaction to form polyesters include adipic acid, maleic acid, phthalic acid, succinic acid, as well as anhydrides and mixtures of the same. Representative polyhydric alcohols include ethylene glycol, triethylene glycol, propylene glycol, butylene glycol, glycerol, trimethylol ethane, trimethylol propane, pentaerythritol, etc. and mixtures of the same. The reaction of these materials to form polyesters ordinarily involves reaction for a few hours, usually with removal of the water formed during reaction. Final water content should be as low as possible, preferably not over 0.1%. The polybasic acid and the polyhydric alcohol are combined in proportions providing a substantial excess of hydroxyl groups over acid groups and the reaction is carried to a point giving a product having terminal hyrdoxy groups with a hydroxyl number of from about 35 to about 400 and an acid number of from 0 to 12. The polyesters are liquid or readily heat softenable resins having relatively low molecular weight, suitably in the range of 250 to 3500.

Reaction of the polyesters with the polyisocyanates to form the prepolymer is carried out in solution. Solvents which operate well here include those which are inert, as previously described, liquid and volatile at normal room temperatures and atmospheric pressures. These will include liquid aromatic hydrocarbons such as benzene, toluene, xylene, mesitylene; linear aliphatic esters of acetic acid the aliphatic radical of which contains 2–6 carbon atoms such as ethyl acetate, propyl acetate, etc.; monoalkyl ester acetates of aliphatic glycols represented by ethylene glycol monoethyl ether acetate; aliphatic and alicyclic ketones such as methyl ethyl ketone, methyl isobutyl ketone, cyclohexanone; and mixtures of the same. The solvent in which the reaction between the polyester (polyol) and the isocyanate is carried out is described above with a view to using or maintaining the same as the solvent for the coating composition, i.e. prepolymer and catalyst in volatile, inert solvent. In either case, and particularly in the case of the coating compositions themselves where pot life and evolution of solvent during the cross-linking step enter as important considerations, the final choice of solvent will depend upon the volatility or evaporation of the solvent. In cases where an extremely short pot life and/or short cross-linking period are desired a solvent having a fast rate of evaporation such as benzene having an evaporation rate (100% at room temperature and atmospheric pressure) of 1.2 hours, methyl ethyl ketone 1.4 hours or ethyl acetate 1.2 hours can be used. Where a more intermediate pot life and/or cross-linking period is desired the solvents such as butyl acetate or xylene having evaporation rates of 8.0 and 13.0 hours, respectively, can be used. For longer pot life and/or cross-linking period, coating compositions such as those using ethylene glycol monoethyl ether acetate having an evaporation rate of 39.0 hours can be used. Mixtures of the solvents can be used to effect variations in the evaporation characteristics as well.

The polyisocyanates which can be used in preparing the prepolymers include polymethylene diisocyanates such as ethylene diisocyanates, hexamethylene diisocyanate and tetramethylene diisocyanate; alkylene diisocyanates such as propylene-1,2-diisocyanate; cycloalkylene diisocyanate such as 1,4-diisocyanate cyclohexane; aromatic diisocyanates such as p-phenylene diisocyanate, m-phenylene diisocyanate, toluene, diisocyanate, p,p'-diphenyl diisocyanate and 1,5-naphthalene diisocyanate; aliphatic aromatic diisocyanates such as p,p'-diphenyl methane diisocyanate and phenylethylene diisocyanate. Reaction of the polyesters with the polyisocyanates to form prepolymers appears to begin at room temperature but limited heating is usually employed to complete the reaction. A substantial excess of isocyanate is employed over the amount required to supply one —NCO group for each hydroxyl group of the polyester. Using a diisocyanate there will ordinarily be used sufficient of the same to provide —NCO groups in twice the number of the available hydroxyl groups of the polyester. Under these conditions on the average, only one —NCO group of each diisocyanate molecule will combine with a hydroxyl group due to the lower reactivity of the second —NCO group on a molecule of which one —NCO group has been reacted, so that the prepolymer is not cross-linked to any great extent.

The cross-linking catalysts which are used in practice of the cross-linking step of the present invention are tertiary amines containing an ester group derived from an acrylic acid, more specifically acrylic or methacrylic acid which can be represented by the formula:

$$\begin{matrix} R \\ \diagdown \\ \diagup \\ R_1 \end{matrix} N-CH_2-CH_2-O-\overset{O}{\underset{\|}{C}}-\underset{R_2}{C}=CH_2$$

wherein R and $R_1$ are alkyl radicals containing 1–4 carbon atoms and $R_2$ is a hydrogen or methyl radical. Tertiary amine ethyl acrylates which are useful as cross-linking catalysts in practice of the present invention then include 2-dimethylamino ethyl acrylate, 2-dimethylamino ethyl methacrylate, 2-diethylamino ethyl methacrylate and 2-diethylamino ethyl acrylate, 2-dipropylamino ethyl acrylate, 2-dipropylamino ethyl methacrylate, 2-dibutylamino ethyl acrylate and 2-dibutylamino ethyl methacrylate, etc. The preferred catalyst is 2-diethylamino ethyl methacrylate.

The featured cross-linking catalysts contain an unshared pair of electrons on the nitrogen atom which are believed to take hydrogen from urethane linkages of the prepolymer. The urethane linkages then react with —NCO groups to form cross-links of the allophanate type, and the catalyst is renewed.

To illustrate the type of linkage, that is the allophanate linkage attained in the featured cross-linking step, note the following illustration in which R and $R_1$ generally represent divalent organic radicals:

I

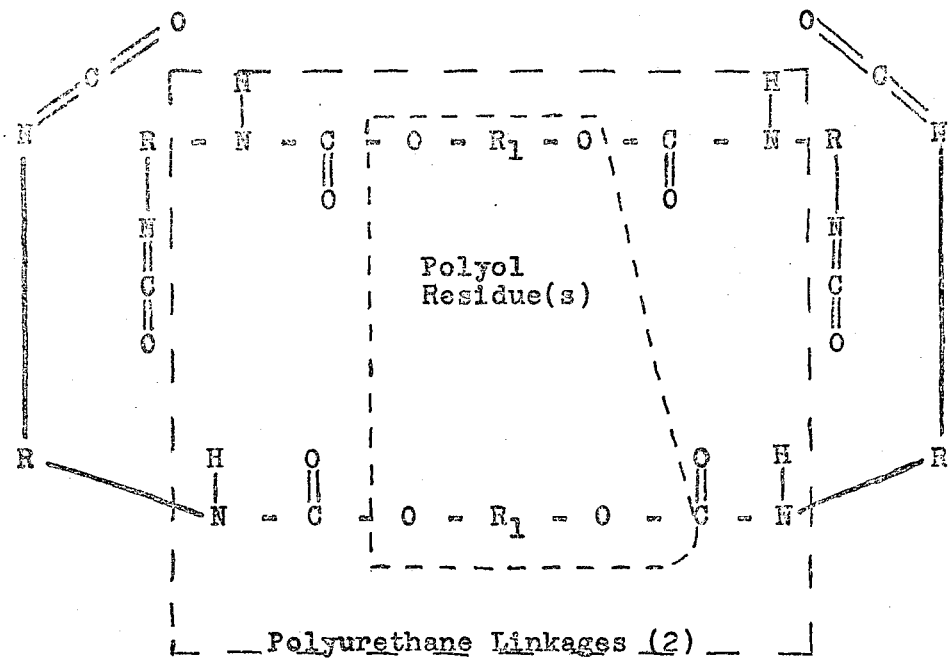

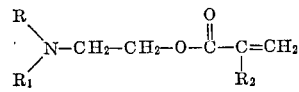

Prepolymer(s) as in I above.

| Tertiary amine ethyl acrylate catalyst

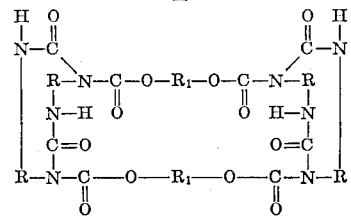

Allophanate Cross-Linked Polymer

The tertiary amine acrylate catalysts when added to a solution of the prepolymer of polyisocyanate and polyester give an unusual and unexpected combination of properties. The mixture of the tertiary amine acrylate catalyst with the polyisocyanate reacted polyester remains stable in solution for a substantial period of time ranging up to several weeks without gelling in a closed can. Unexpectedly, this stable material when coated on a surface and dried by evaporation of solvent cures rapidly to a tough, uniform film.

The quantity of tertiary amine acrylate catalyst employed depends on the extent and rate of cross-linking desired in the final coating. Ordinarily there will be used from about 5.0–30.0% of the number of mols equivalent to the unreacted —NCO groups in the prepolymer composition.

The combination of selected prepolymer materials with the novel catalyst gives coating compositions having special utility for coating on and cooperation with varnish coatings on leather to provide a tough, non-cracking, lustrous patent leather product.

While the present coating compositions appear to cooperate in a special way with varnish coatings such as the vegetable drrying oil varnishes and particularly linseed oil varnish, the compositions also work well as top coatings for other finishes used on leathers such as coatings of polymers and copolymers of acrylic and methacrylic acid esters, styrene, butadiene styrene, and vinyl acetate, alkyd resins and combinations of these and other resins of this type.

The coating compositions may be applied to a variety of surfaces such as wood, metal and various plastics. Where the coating composition has a relatively low viscosity as in the compositions developed for patent leather finishes, some difficulty may be encountered in coating porous surfaces, such as unfinished leather, but this difficulty may be avoided by the use of sizings or precoats to prevent excessive penetration. The excellent bond obtained between the present coatings and drying oil type finishes suggests the use of the materials in combination with such coatings either as a top coat or as a primer.

It has also been found that for certain uses, such as for coating wood, coatings with superior properties may be obtained by special combinations of the non-reactive volatile aromatic hydrocarbon solvents, e.g. benzene, toluene, xylene, etc. with diluents. For example, up to about 15% non-reactive low boiling aliphatic hydrocarbons such as petroleum naphtha may be included as diluents with the aromatic hydrocarbon solvents with the aid of from about 5% to about 15% by weight based on the weight of the aliphatic hydrocarbon diluent of a solvent coupler, more precisely a solvent-diluent coupler, such as triethyl phosphate or ethylene glycol monoethyl ether acetate. In addition to being used as a solvent coupler in coating compositions relying upon an aromatic hydrocarbon as a solvent, ethylene glycol monoethyl ether acetate, as previously indicated, can itself perform as a solvent. Coating compositions diluted and provided with solvent couplers exhibit viscosity and brushing characteristics which enable the deposition of a relatively thick, but quick drying, coating. It appears that the naphtha volatilizes from the coating more rapidly because of its non-solvent action on the resinous components and also is more effective for reducing viscosity of the resinous composition than a comparable amount of a true solvent. Other volatile organic liquids which are not strictly solvents for the resinous components may also be used as diluents in combination with true solvents in forming the coating compositions of the present invention.

Pigments may be incorporated in the coating composition provided they are non-reactive, preferably neutral to slightly acid, and free from water.

The following examples are given to aid in understanding the invention but it is to be understood that the invention is not restricted to the materials, proportions or procedures set forth in the example except as required by the appended claims.

*Example I*

41 parts by weight of 2,4-tolylene diisocyanate was dissolved in a mixture of 41 parts by weight toluene and 120 parts by weight ethylene glycol monoethyl ether acetate in equal proportions by weight and the mixture was stirred to insure uniform solution. A second solution was prepared comprising 68 parts by weight of a polyester formed by esterification and polymerization of 3 mols of adipic acid, one mol of trimethylolpropane, and one mol of 1,3-butylene glycol, and having a hydroxyl value of from 162 to 179, an acid number of from 2 to 3, a water content of 0.06%, and molecular weight of approximately 700 (Multron R–12), and 31 parts of a polyester formed by esterification and polymerization of adipic acid with butylene glycol having a hydroxyl value of from 40 to 47, an acid number of from 1 to 2, a water content of 0.06% and a molecular weight of about 2800 (Multron R–16) in 99 parts of toluene. The polyester resin solution was added progressively to the solution of tolylene diisocyanate and when it was all added agitation was continued until a uniform mixture was formed. The temperature increased upon agitation and was allowed six hours for completeness of reaction. On analysis by standard method, the composition was found to have 2.48% by weight of —NCO. The composition was then cooled to room temperature.

A catalyst solution was prepared comprising 7.91 parts by weight of 2-diethylamino ethyl methacrylate in 28.87 parts by weight of toluene and 0.22 part by weight of azo oil black dye.

A piece of leather was bottomed and buffed in accordance with usual procedure and given two coats of the usual linseed oil patent leather finish composition with drying after each coat.

The solution of 2-diethylamino methyl methacrylate was added to the solution of the reaction product of the polyesters and the tolylene diisocyanate and mixed in thoroughly. The mixture was sprayed onto the coated surface of the leather, allowed to dry and then cured by heating in the range of 110° to 140° F. for 12 hours. The resultant coating was flexible, abrasion-resistant, solvent-resistant, lustrous and non-tacky.

*Example II*

A solvent mixture was prepared by adding 5 parts by weight of triethyl phosphate to 50 parts by weight of toluene with stirring to form a uniform mixture. 20 parts by weight of petroleum naphtha was added and thoroughly mixed in.

10 parts by weight of 2,4-tolylene diisocyanate was added to 60 parts by weight of the above solvent mixture and thoroughly mixed. 15 parts by weight of a polyester formed by esterification and polymerization of 31.7 parts by weight of phthalic acid, 10.5 parts by weight of adipic acid, 1.0 part by weight of maleic acid, 36.4 parts by weight of trimethylolpropane, and 20.4 parts by weight of C–6 to C–11 fraction of Fischer-Tropsch fatty acids (Multron R–22) was added to 15 parts by weight of toluene. This solution was added to the tolylene diisocyanate solution at room temperature with agitation. The temperature was then increased to 150° C. and held at this temperature for about 6 hours. The product was cooled to room temperature. This product has an —NCO content of 2.41% by weight.

2.39 parts by weight of 2-diethylamino ethyl acrylate was dissolved in toluene to bring its weight to 10 parts by weight.

The catalyst solution was added to the solution of the polyester and tolylene diisocyanate and mixed thoroughly. This mixture was brushed on a wood surface and allowed to dry. In 1 hour a second coat was applied and allowed to dry.

One day after application of the coatings, the finish was hard, non-tacky, lustrous, and resistant to water, solvents and abrasion.

*Example III*

284 parts by weight of ethylene glycol monoethyl ether acetate was added to 413 parts by weight of toluene and stirred to form a uniform mixture. 400 parts by weight of petroleum naphtha and 1020 parts by weight of xylene were added and mixed in. To the resultant solvent mixture 317 parts by weight of 2,4-tolylene diisocyanate were added to 2117 parts by weight of the solvent mixture and agitated to form a uniform composition. 583 parts by weight of the same polyester used in preceding Example II was dissolved in toluene to form a 50% solids solution. The polyester resin solution was added to the tolylene diisocyanate solution at room temperature with agitation. The temperature was increased to 150° F. with continued agitation and held at this temperature for about 6 hours. The composition was then cooled to room temperature. The composition has an —NCO content of 2.2% by weight.

61 parts by weight of the 2-diethylamino ethyl methacrylate was dissolved in toluene to give 360 parts by weight of solution.

The 2-diethylamino ethyl methacrylate solution was added to the polyester diisocyanate solution and thoroughly mixed. The composition was brushed on wood in accordance with the procedure of Example II and hardened to form a clear, lustrous, top solvent-, water-, and abrasion-resistant coating.

*Example IV*

827 parts of a 80:20 mixture of 2,4- and 2,6-tolylene diisocyanates were dissolved in an equal weight of toluene. 1,000 parts of a polypropylene glycol having an acid number of 0.05, a hydroxyl number of 240, a molecular weight of 700, and a viscosity of 90 to 100 centipoises was combined with 1,000 parts of toluene. The propylene glycol solution was added progressively to the tolylene diisocyanate solution with agitation. When thorough mixture was had, the temperature increased due to heat of reaction and the warm composition was agitated for about 6 hours to allow the reaction to proceed. The composition was then cooled to room temperature. The composition was found to have an —NCO content of 5.45% by weight.

212 grams of 2-diethylamino ethyl methacrylate was dissolved in toluene to yield 365 parts and the resultant solution added to the propylene glycol diisocyanate solution. The composition was brushed onto a wood surface, allowed to dry for 2 hours and given a second coating. Three hours after application of the second coating the surface had dried to a hard, lustrous, water-, solvent-, and abrasion-resistant condition.

Having thus described our invention, what we claim as new and desire to secure by Letters Patent of the United States is:

1. A coating composition adapted to provide on curing a cross-linked resinous film, the said composition consisting essentially of a volatile non-reactive organic solvent solution of (a) a prepolymer obtained from having reacted a polyester having terminal hydroxyl groups with an organic diisocyanate, the said diisocyanate in excess of that amount required to provide an —NCO group for reaction with each of said hydroxyl groups, and (b) 5% to 30% mols equivalent based on the number of unreacted —NCO groups in said prepolymer of a tertiary amine acrylate catalyst which can be represented by the formula:

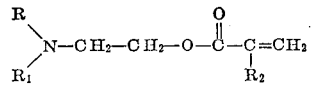

wherein R and $R_1$ are selected from the class consisting of alkyl radicals containing 1–4 carbon atoms and $R_2$ is selected from the class consisting of hydrogen and methyl radical.

2. A coating composition according to claim 1 wherein the tertiary amine acrylate catalyst is 2-diethylamino ethyl acrylate.

3. A coating composition according to claim 1 wherein the tertiary amine acrylate catalyst is 2-diethylamino ethyl methacrylate.

4. A coating composition according to claim 1 wherein the (a) prepolymer is obtained from reaction of a polyester having terminal hydroxyl groups with an organic diisocyanate, the said diisocyanate being reacted being in sufficient amount to provide twice as many —NCO groups as there are hydroxyl groups on the polyester.

5. A coating composition according to claim 1 wherein the (a) prepolymer is obtained from reaction of a polyester having terminal hydroxyl groups with an organic diisocyanate, the said diisocyanate being reacted being in sufficient amount to provide 2.0 to 2.2 times as many —NCO groups as there are hydroxyl groups on the polyester.

6. A coating composition according to claim 1 wherein the polyester has a hydroxyl number of from about 35 to about 400, an acid number of about 0 to about 12 and molecular weight of from about 250 to about 3500.

References Cited by the Examiner

UNITED STATES PATENTS

| | | | |
|---|---|---|---|
| 1,954,750 | 4/1934 | Hopkins | 117—76 |
| 2,138,031 | 11/1938 | Graves | 260—89.5 |
| 2,138,763 | 11/1938 | Graves | 260—486 |
| 2,624,683 | 1/1953 | Bezman | 117—76 |
| 2,676,161 | 4/1954 | Charlton et al. | 260—75 |
| 2,697,048 | 12/1954 | Secrist | 117—76 |
| 2,721,811 | 10/1955 | Dacey et al. | 260—75 |
| 2,723,265 | 11/1955 | Stallman | 260—75 |
| 2,764,565 | 9/1956 | Hoppe et al. | 260—75 |
| 2,778,810 | 1/1957 | Muller et al. | 260—75 |
| 2,828,221 | 3/1958 | McWherter et al. | 117—76 |
| 2,836,575 | 5/1958 | Jones et al. | 260—30.6 |
| 2,837,498 | 6/1958 | Ferstandig | 260—75 |
| 2,866,762 | 12/1958 | Brochhagen et al. | 260—75 |
| 2,872,429 | 2/1959 | Schwartz | 260—30.6 |
| 2,913,425 | 11/1959 | Muller et al. | 260—2.5 |

FOREIGN PATENTS 161,741 3/1955 Australia.

MORRIS LIEBMAN, *Primary Examiner.*

WILLIAM D. MARTIN, LESLIE H. GASTON,
*Examiners.*